United States Patent [19]

Schoenrock

[11] Patent Number: 4,511,476

[45] Date of Patent: Apr. 16, 1985

[54] METHOD FOR PREVENTING COMPACTION IN SORBENT BEDS

[75] Inventor: Karlheinz W. Schoenrock, Ogden, Utah

[73] Assignee: The Amalgamated Sugar Company, Ogden, Utah

[21] Appl. No.: 458,273

[22] Filed: Jan. 17, 1983

[51] Int. Cl.³ .............................................. B01D 15/00
[52] U.S. Cl. .................................................... 210/678
[58] Field of Search ............... 210/660, 678, 275, 284, 210/264

[56] References Cited

U.S. PATENT DOCUMENTS

| | | | |
|---|---|---|---|
| 3,831,755 | 8/1974 | Goodman et al. | 210/275 |
| 4,400,278 | 8/1983 | Martinola | 210/275 |
| 4,412,866 | 11/1983 | Schoenrock et al. | 127/46.2 |

Primary Examiner—Ivars Cintins
Attorney, Agent, or Firm—Trask & Britt

[57] ABSTRACT

The direction of circulating fluid flow in a closed loop simulated moving bed process is periodically reversed within a selected portion of the bed while maintaining normal flow throughout the remainder of the loop. Each selected portion is contained within a discrete vessel, and at preselected times, flow is reversed in each vessel in turn so that during a complete cycle of the process the entire bed is backwashed for an interval sufficient to avoid compaction.

6 Claims, 3 Drawing Figures

METHOD FOR PREVENTING COMPACTION IN SORBENT BEDS

RELATED APPLICATIONS

Copending, commonly assigned U.S. patent application Ser. No. 267,065, filed May 26, 1981, entitled "METHOD AND APPARATUS FOR THE SORPTION AND SEPARATION OF DISSOLVED CONSTITUENTS" (now U.S. Pat. No. 4,412,866 dated Nov. 1, 1983) describes certain improvements in closed loop ion exchange processes of the type commonly referred to as "simulated moving bed" processes. The present application discloses and claims a procedure useful in connection with the apparatus and general procedures of Ser. No. 267,065, as well as other processes involving sorbent beds connected in series within a closed loop. The disclosure of Ser. No. 267,065 is incorporated by reference as a portion of this disclosure.

BACKGROUND OF THE INVENTION

1. Field

This invention relates to closed loop ion exchange processes. It is specifically directed to the prevention of compaction in the sorbent beds in such processes conducted in a simulated moving bed of sorbents.

2. State of the Art

Ion exchange systems which involve the passing of liquids containing at least two components through an ion exchanger are well known. Such processes are sometimes referred to as adsorber systems, and the process whereby one dissolved constituent is separated from another dissolved constituent by passing through an ion exchanger or adsorber bed is sometimes referred to as "adsorbtive separation". These processes generally involve passing a solution through a bed of resin, whereby one constituent is attracted to the resin bed, followed by an elution, or regeneration, step. The elution step removes the adsorbed constituent from the resin as "extract." The solution from which the adsorbed constituent has been removed is referred to as "raffinate," or sometimes "ashes." A common procedure is to contact the absorber bed (ion exchange resin) alternately with the feed stock (solution of constituents) and eluant, respectively, to achieve this separation. The feed stock and eluant may flow in either co-current or counter-current relationship through a stationary bed. Use of a stationary bed has limited the application of ion exchange separation techniques to batch operations.

Efforts have been made to conduct ion exchange processes in a fashion which simulates the characteristics of a continuous operation. One such approach has been physically to move the exchange resin, either continuously or by periodic pulsing, from one zone to another zone. Each zone is then operated continuously, either in an adsorber (or loading) cycle, or an elution (or de-sorbing) cycle. Mechanical wear, such as that caused by friction on the individual particles of resin, has been destructive. Accordingly, processes involving the physical movement of the ion exchange resin have not gained wide acceptance.

U.S. Pat. No. 2,985,589 (Broughton et al) discloses a continuous sorption process employing a stationary or fixed bed in a fashion which simulates a moving bed. Stationary beds operated by such procedures are commonly referred to as "pseudo-moving beds," or more often, as "simulated moving beds". More recent patents disclosing simulated moving bed processes include U.S. Pat. Nos. 4,182,633 (Ishikawa et al); 4,293,346 (Landis et al); 4,312,678 (Landis); and 4,319,929 (Fickel).

The simulated moving bed of the prior art represented by the aforementioned patents, generally is constructed as a single column partitioned into a plurality of individual compartments. The aforementioned Ser. No. 267,065 provides portions of the bed in discrete compartments connected for series flow in a closed loop. In either event, the individual compartments may be regarded as zones, connected in series with an inlet at the top of each zone and an outlet at its bottom. The process is regarded as continuous because a continuous circulation flow is maintained through the zones in series, the circulation liquid being collected at the bottom of the last zone in the series, after having percolated through each of the preceding zones in the loop. The collected liquid is re-introduced to the first zone of the series for recirculation. The inlets and outlets of each zone in the system are connected by means of an exterior manifold with appropriate valving to selectively introduce feed stock or eluant to the top of any zone, and to withdraw raffinate or extract from the bottom of any appropriate zone. Each zone may thus function in turn as the sorption zone, the displacement zone, the elution zone and the rinse (or regeneration) zone. The function of the zone is established by the nature of the medium which is either entering or leaving the zone at any particular moment. A complete cycle of the process is thus comprised of a series of modes of operation corresponding to the number of functions served in order by each zone.

It is an important objective in the operation of a simulated bed to maintain well defined interfaces between the various phases flowing through the system. Although the zones are ordinarily treated in batch fashion, the interface between adjacent phases progresses through the system continuously. An effort is made to correlate the opening of the manifold valve associated with an outlet (and the closing of the outlet valves of other zones) with the arrival of the front of the raffinate phase at that outlet. Opening of the appropriate outlet manifold valves is coordinated with the opening of inlet valves for the introduction of feed stock and eluant to the tops of the appropriate zones within the system. Introduction of these liquids is desirably done in a fashion which maintains an undisturbed interface between the liquid phases flowing through the column.

The simulated moving bed processes which have evolved suffer from a number of inherent shortcomings. For example, the use of a bed or ion exchange resin always requires periodic backwashing of the sorbent material, both for the removal of fines and to loosen the bed. After a period of operation, the inevitable compaction of the resin causes an intolerable pressure drop across the bed. A compacted bed impedes the percolation of liquid through the column. Moreover, it is important that the beds confined within each zone of a column be classified periodically into layers of equal particle size. Otherwise, it is impractical to maintain approximately equivalent conditions within each zone. It is also important periodically to remove entrained gas pockets from within the bed, because they tend to disturb the desired even cross-sectional fluid flow through the bed. According to conventional practice, when backwashing has become critically important, the entire bed has been removed from the column and replaced.

Recently, several procedures have been suggested to avoid this requirement, but none of these procedures is entirely satisfactory.

U.S. Pat. No. 4,001,113 discloses an ion exchange treating system in which two or more exchangers or absorber vessels are connected in series, and each vessel is filled with ion exchange resin leaving sufficient free board to allow for expansion of the medium. The process disclosed does not involve a simulated moving bed, but the necessity for periodic backwashing is nevertheless present. Each vessel is provided with an expansion chamber positioned directly above it to accept resin during backwashing procedures. Each vessel is also provided with distribution systems at the top and bottom for the introduction or withdrawal of liquids. The aforementioned Ser. No. 267,065 discloses a simulated moving bed process in which each zone comprises one or more discrete vessels. Each of the vessels may be provided with a port at its top which communicates through valving to an expansion chamber. The expansion chamber functions as a receiver for backwashed compacted sorbent bed so that the bed of each vessel may be periodically fluidized and reclassified. This arrangement avoids the inconveniences attendant to maintaining the bed in a tall column. Several zone vessels may communicate with a single expansion chamber. The vessel being backwashed is non-operational from the standpoint of the process. That is, none of the specific functions of the process is performed in the vessel during backwashing. Accordngly, backwashing is done as infrequently as conditions will allow.

U.S. Pat. No. 4,293,346 discloses a backwashing procedure of sorts for simulated moving bed processes. The procedure suggested by that patent involves isolating a portion of the sorbent bed in a non-operational zone, and subjecting the isolated portion to continuous backwashing during a complete mode of operation. In effect, an additional zone is imposed on the process. The location of the backwashing zone is advanced along with the operational zones as the cycle is advanced through the several modes of the process. Although the process cycle can continue during backwashing, a portion of the sorbent bed is always in a non-operational condition.

An alternative procedure is suggested by U.S. Pat. No. 4,319,929, according to which circulation through a column is entirely stopped between the modes of a cycle while backflushing is conducted in the zone which has just served as the adsorption zone. This approach permits backwashing to occur over a relatively shorter period of time and utilizes the entire sorbent bed simultaneously in operational zones, but efficiency is negatively impacted by intermittently interrupting circulation.

Successful operation of a simulated moving bed process depends upon the maintenance of steady state equilibrium, as reflected by the absence of drift in the concentration gradient of the various components to be separated and in the fractions collected from the circulating loop. As previously indicated, it is important to maintain well defined fronts for the various phases flowing through the loop. It is also important reliably to predict the progress of these fronts through the loop. This prediction is correlated both to the establishment of a circulation flow rate within the loop and to the timing of shifting the opening and closing of the inlet and outlet ports connected to the manifold system. Traditionally, establishing both the circulation flow rate and the timing of the manifold flow control have been based upon either trial and error or complicated measurements of component concentrations. The aforementioned U.S. Pat. No. 4,182,633 discloses one approach to controlling a simulated moving bed process which involves measurements and rather complex computations. The aforementioned Ser. No. 267,065 discloses a reliable method for controlling a process without elaborate computations by fixing the circulating flow rate through a series of discrete vessels and then establishing cycling frequency in accordance with a known mathematical relationship based upon the flow rate of the non-sorbed component. In practice, the backwashing procedures suggested for the process, while helpful, are in need of further enhancement. Unfortunately, the other procedures heretofore known, including those of U.S. Pat. Nos. 4,293,346 and 4,319,929, are incompatible with the procedures of Ser. No. 267,065.

The disclosures of all of the aforementioned patents are incorporated by reference, and are considered to be generally instructive concerning the art of simulated moving bed processes.

SUMMARY OF THE INVENTION

This invention comprises a simulated moving bed method including a backwashing procedure which avoids the problems previously enumerated. Although the method may be practiced in connection with various closed loop sorbent bed processes, it will be described herein with particular reference to the method and apparatus of Ser. No. 267,065. The apparatus of a preferred embodiment of this invention thus comprises a series of individual vessels, each of which functions as a zone within a loop of recycling liquid medium. The apparatus ordinarily includes a minimum of four separate vessels corresponding to the four media usually accommodated by the process; namely, feed stock, eluant, extract and raffinate. That is, the zones may be identified as the sorption zone, the displacement zone, the elution zone and the rinse or regeneration zone. Each zone serves each function in sequence as the process proceeds in steps. Progress from one step to the next is coordinated to the migration of the fronts between phases within the circulating liquid. Any of the zones may include more than one vessel, but ordinarily the total number of vessels in a loop will be a multiple of four, with an equivalent volume of exchanger or absorbent contained within each zone. It should be understood that the invention is readily adapted to processes accommodating a different number of media. In general, the minimum number of discrete vessels in the system; i.e., the number of zones in the system, should equal the total number of streams introduced and withdrawn from the system.

Ideally, a fluid dome is maintained at the top of each vessel, a distributor apparatus is positioned within the vessel at the interface between this fluid dome and the medium contained within that vessel. Thus, any of the aforementioned four liquid streams introduced to a vessel enters through the distributor just below the fluid dome, thereby maintaining a sharp interface between the dome above and the liquid stream entering the vessel below the dome but preferably above the compacted sorbent bed. A second distributor apparatus is installed at the bottom of each vessel to withdraw liquids uniformly across the cross-sectional area of the compacted bed contained by the vessel.

The fluid dome most often used in the processes of specific interest to this disclosure consists of water. It should be understood, however, that any liquid or gas which is compatible with the medium in the zone and floats on that medium could be used. The fluid used as the eluant in the process will usually be a suitable dome material.

The top and bottom distributors of all of the vessels are connected by a manifold system through valves so that the inlets may selectively be opened or closed to the introduction of either feed stock solution or eluant liquid and the outlets of any vessel may selectively be opened or closed to piping arranged for the withdrawal of extract or raffinate fractions. Without regard to the aforementioned valving and manifold system, the inlet of each vessel in the loop is connected to the outlet of a preceding vessel so that a continuous circulation of liquid is maintained through all of the vessels in the system. A front develops between a phase comprising the remnants of the feed solution containing the non-separated component (raffinate) and the eluant. Ideally, this front is kept as sharp as possible, but in practice, the phases will mingle somewhat at their interface. For control purposes, the front is regarded as the portion of the circulating liquid in which the composition changes rapidly from that of the raffinate to that of the eluant. Circulation pressure is maintained substantially constant through the use of booster pumps between vessels in the loop. The flow rate of the recycling medium, and thus the migration rate of the front, is controlled by means of one or more valves located strategically within the loop. Ordinarily, adequate control may be maintained with a single such valve located proximate the inlet to one of the vessels.

According to this invention, backwashing is effected without rendering any portion of the adsorbent bed non-operational. Forward circulation flow is maintained, and the separation profile (the location of the fronts) of the process is substantially undisturbed. The backwashing procedure is effective to prevent significant compaction of the sorbent, thereby increasing the efficiency of the process. Moreover, practice of this invention increases the capacity of the process, reduces the risk of product contamination, increases the useful life of the sorbent and reduces operating costs. The manifold system associated with the sorbent bed is adapted to provide for intermittent reversal of the direction of flow within a portion of the bed. This portion may be located between an inlet and an outlet, for example. Ordinarily, this reversal of flow is confined to the portion of the bed contained within one of the zones or one or more of the specific vessels of a zone. Flow reversal during any mode of the cycle may be maintained for as long as required for effective treatment. Ordinarily, a duration of a few seconds to several minutes, and rarely more than about ten percent of the duration of the mode, is sufficient.

According to a preferred embodiment of the invention, backwashing is effected in each vessel of the system during a fraction of each period during which the bed contained within that vessel is operating in the rinse (e.g., water) phase. Valving associated with the manifold is adjusted so that for an appropriate interval the normal inlet to the vessel functions as the outlet while the normal outlet to the vessel functions as the inlet. In other words, for the duration of backwashing, the circulating fluid within the closed loop is introduced to the normal downstream (bottom) location of the bed and withdrawn from the normal upstream (top) location of the bed within the vessel. Eluant is obtained from its normal source within the manifold system and extract is directed to the portion of the manifold system which would otherwise be carrying it during the mode in operation.

BRIEF DESCRIPTION OF THE DRAWINGS

In the drawings, which illustrate that which is presently regarded as the best mode for carrying out the invention.

DESCRIPTION OF THE ILLUSTRATED EMBODIMENTS

Figure 1:
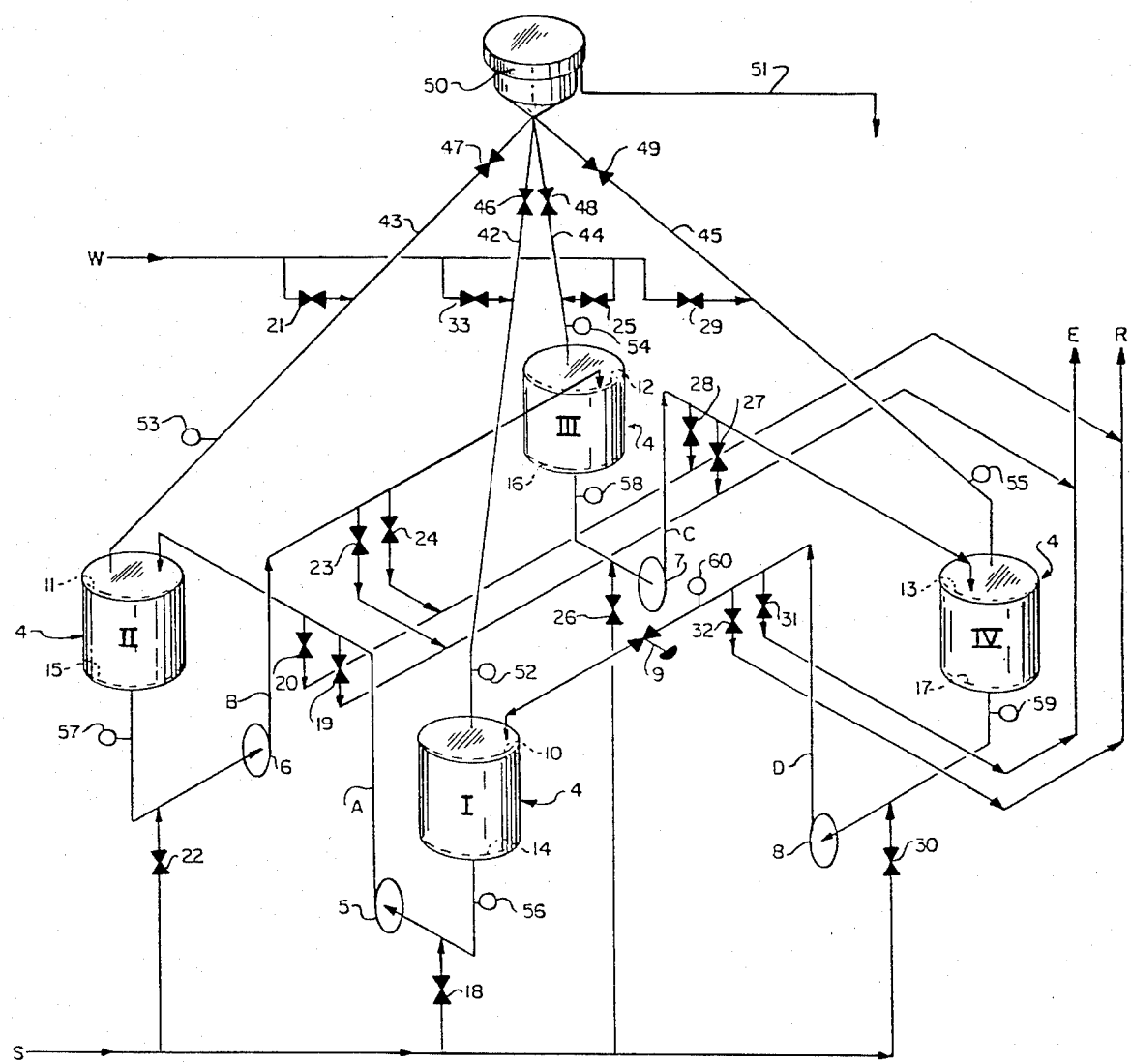
FIG. 1 is a schematic partially pictorial illustration of four zone vessels and an expansion chamber interconnected in a closed loop process.
Figure 2:
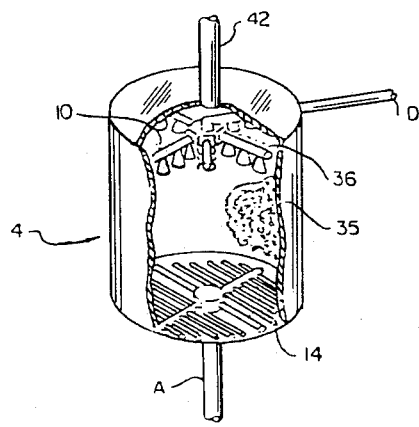
FIG. 2 is a pictorial view, partially broken away, showing a typical zone vessel.

FIG. 1 illustrates a closed loop simulated bed process including four equivalent reaction zones I, II, III and IV, each of which includes at least one discrete vessel 4, such as that shown in more detail by FIG. 2. The zones I, II, III and IV are connected in series with the outlet of each zone connected to an inlet of the next zone in the series. Thus, as shown by FIG. 1, the outlet of the vessel 4 comprising zone I is connected by a conduit A to the inlet at the top of the vessel 4 comprising zone II. A booster pump 5 is interposed in conduit A. In similar fashion, the other outlets and inlets of all of the zones I, II, III and IV are interconnected for series flow through the conduits B, C, D and booster pumps 6, 7, 8. A flow control valve 9 in the conduit D regulates the circulation rate of liquid through the loop comprising the zones I, II, III, IV, the conduits A, B, C, D and the pumps 5, 6, 7, 8.

As best shown by FIG. 2, which for purposes of illustration is numbered as though it is the vessel 4 comprising zone I of FIG. 1, the inlet of each vessel 4 terminates in a feed distributor apparatus 10, 11, 12, 13, respectively, and the outlet of each vessel 4 originates as a withdrawal distributor apparatus 14, 15, 16, 17, respectively. The approximate locations of the distributor devices are shown in phantom lines in FIG. 1. These devices, while not a portion of this invention, are desirable for the maintenance of a uniform, non-turbulent flow of fluid from top to bottom of the vessel. It is significant that the practice of this invention does not negatively impact upon the use of such devices.

Referring to FIG. 1, a system of valves 18 through 33 may interconnect the conduits A, B, C, D of the circulation loop to a manifold system arranged to conduct the various media E, S, R and W accommodated by the process illustrated. For clarity, each manifold is identified to the medium it conducts. That is, the feed stream S is conducted through the S manifold, the eluant W is conducted through the W manifold, the extract E is conducted through the E manifold, and the raffinate R is conducted through the R manifold. The feed stream is designated S and the eluant stream is designated W because the process illustrated will be explained with reference to an inverted sugar solution feed stream and water eluant. That is, the raffinate R will include polysaccharides and glucose and the extract E is an aqueous solution of fructose. As illustrated by FIG. 1, the W manifold is not actually interconnected to the conduits A, B, C, D, although it could be. The parent application Ser. No. 267,065 explains why the use of a water dome makes the arrangement illustrated by FIG. 1 desirable when water is used as the eluant.

The vessels 4 are packed with an appropriate bed 35 of absorber or resin, as best shown by FIG. 2. Desirably, the bed should substantially fill the vessel 4 from its bottom to at least near inlet distributor 10 when expanded. Room should be left above the distributor 10 for a water dome 36 to float above the medium entering the vessel 4 through the distributor 10. The entering medium thus spreads across the top of the bed 35 and then percolates down. The bed 35 should be completely immersed in the medium, and void of entrapped gas.

Because water dome 36 is illustrated, and because the use of water as the eluant is assumed, the valves, 21, 25, 29 and 33 of the manifold are shown interconnecting the tops of the vessels 4 of zones I, II, III, IV through pipes 42, 43, 44, 45. Thus, water introduced to a vessel 4, e.g., through pipe 42, displaces the water from dome 36 downward, thereby providing fresh water for the dome 36. The pipes 42, 43, 44, 45 are also connected through valves 46, 47, 48, 49, respectively, to an expansion chamber 50, with an overflow pipe 51. This arrangement permits periodic individual backwashing of each of the vessels 4 without disturbing any of the other vessels in any of the zones I, II, III, IV.

Pressure gauges 52, 53, 54, 55 are located in each of the water pipes 42, 43, 44, 45. Similar gauges 56, 57, 58, 59 are located at the outlets of each vessel 4 of zones I, II, III and IV. A similar gauge 60 is located upstream of valve 9 in the circulating loop. These gauges, or other pressure-sensing devices, are useful for maintaining the appropriate pressure balance throughout the system.

Assuming steady state operation of a system such as that illustrated by FIG. 1 applied to an invert sugar solution and using water domes 36 at the top of each vessel 4, a circulation flow is maintained through the loop by means of the pumps 5, 6, 7, 8, so that fluid percolates down through each bed 35 contained by each zone in series from I through IV and then back through flow control valve 9 to zone I for recirculation continuously through the zones in series. The valves 18 through 33 are then set to establish the following flow patterns: Invert sugar solution S is introduced to distributor 12 in zone III. Water W is simultaneously introduced into the top of zone I through pipe 42 to displace the water dome 36 and any sugar which may have migrated into it. Raffinate R is displaced through distributor 16 of zone III, while extract E is displaced from zone I through distributor 14. During this sequence, the front of the non-sorbed component continues to pass through zone IV because of the normal circulation flow established in the loop. When that front arrives in the conduit D, the valves 18 through 33 are reset approximately simultaneously to change the functions of each zone. Thus, the feed stream S is now introduced through the distributor 13 at the top of zone IV to displace raffinate R through distributor 17. Simultaneously, the introduction of water W is transferred through pipe 43 to the top of zone II to displace extract E through distributor 15. During this sequence, the front of the non-sorbed component migrates through zone I. When this front reaches conduit A, the valves 18 through 33 are again adjusted to shift the function of each zone; that is, water W is introduced to the top of zone III, and sugar solution S is introduced to the top of zone I. When the front of the non-sorbed component reaches conduit B, the valves 18 through 33 are once more adjusted so that water W is introduced to the top of zone IV and feedstock S is introduced to the top of zone II.

Table 1 correlates the timing of the four steps of the illustrated process with the location of the front of the non-sorbed component. This front corresponds to the interface between the raffinate phase and a nearly pure water phase. The table also indicates those valves of each manifold shown by FIG. 1 which are open during each step and identifies the media introduced to and withdrawn from the zones during each step.

TABLE 1

| Start Step | Raffinate Front Conduit Location | Manifold Valves Open (All Other Closed) | | | | Vessel Connections | | | |
|---|---|---|---|---|---|---|---|---|---|
| | | S | R | W | E | Input | | Output | |
| | | | | | | W | S | E | R |
| 1 | C | 22 | 28 | 33 | 19 | I | III | I | III |
| 2 | D | 26 | 32 | 21 | 23 | II | IV | II | IV |
| 3 | A | 30 | 20 | 25 | 27 | III | I | III | I |
| 4 | B | 18 | 24 | 29 | 31 | IV | II | IV | II |

Figure 3:
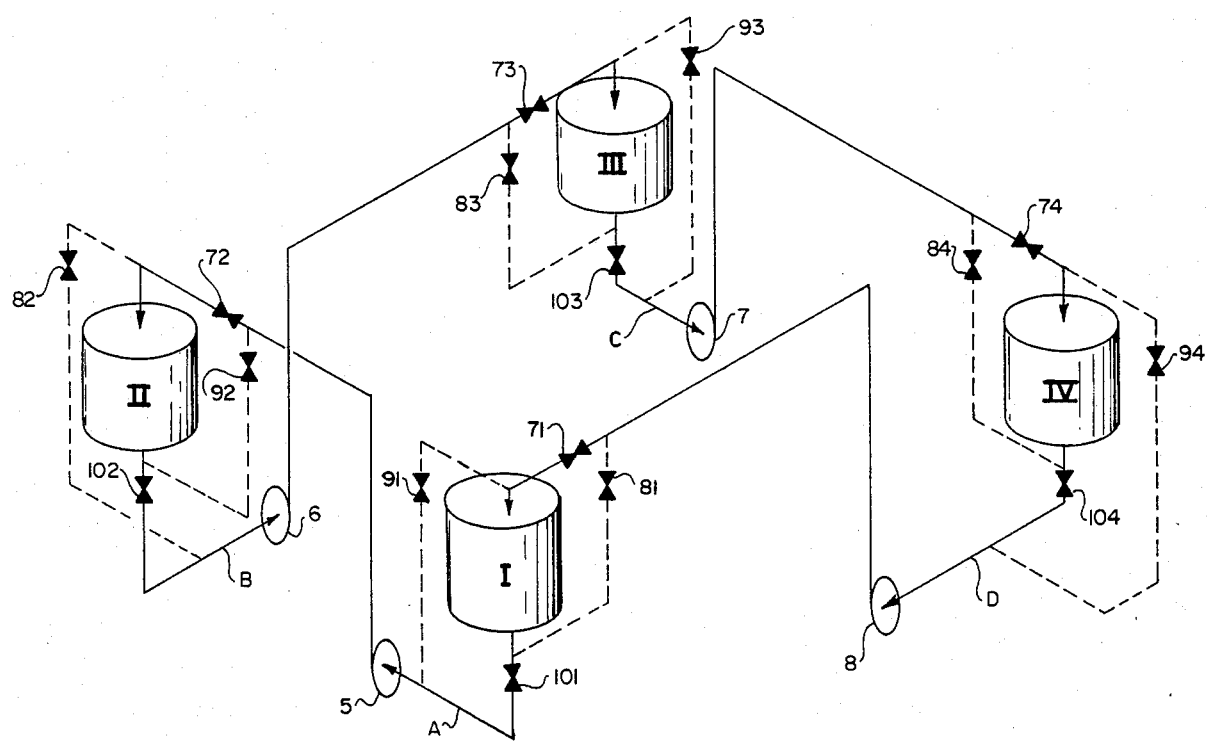
FIG. 3 is a schematic illustration of the closed loop process of FIG. 1 with a modified manifold arrangement.

Even though the individual vessels of the zones I, II, III and IV may be backwashed from time-to-time, the sorbent beds contained by each vessel inevitably becomes progressively compressed in practice. Backwashing is usually practiced infrequently and irregularly because of the reluctance of operators to incur the delays, loss of product and other difficulties associated with backwashing. The backwashing procedure requires the association of normal process operations for its duration. FIG. 3 illustrates modifications to the manifold arrangement of FIG. 1 which completely avoids progressive compaction of the sorbent beds while maintaining continuous forward flow of the circulating loop (conduits A, B, C and D).

FIG. 3 shows the zones I, II, III and IV interconnected in a loop through conduits A, B, C and D by pumps 5, 6, 7 and 8, respectively. For simplicity of explanation, the other manifold components illustrated by FIG. 1 are omitted, but it should be understood that the input and output streams of the process are introduced and withdrawn from the loop exactly as explained in connection with FIG. 1. The direction of flow within a selected sorbent bed is momentarily reversed in accordance with this invention without disturbing the forward flow within the loop or the separation profile of the process. This reversal of flow is achieved by the valves and conduits shown by FIG. 3. Table 2 correlates the condition (open or closed) of the valves with the occurrence of reversed flow or normal flow direction with a sorbent bed (The table assumes one bed per zone.)

TABLE 2

| Zone | Valve | Flow Direction | |
|---|---|---|---|
| | | Normal | Reverse |
| I | 71 | Open | Closed |
| | 81 | Closed | Open |
| | 91 | Closed | Open |
| | 101 | Open | Closed |
| II | 72 | Open | Closed |
| | 82 | Closed | Open |
| | 92 | Closed | Open |
| | 102 | Open | Closed |
| III | 73 | Open | Closed |
| | 83 | Closed | Open |
| | 93 | Closed | Open |
| | 103 | Open | Closed |
| IV | 74 | Open | Closed |
| | 84 | Closed | Open |

TABLE 2-continued

| Zone | Valve | Flow Direction | |
|---|---|---|---|
| | | Normal | Reverse |
| | 94 | Closed | Open |
| | 104 | Open | Closed |

During normal operation of the process, as explained previously, circulation through the loop is such that the direction of flow through each zone vessel of FIG. 3 is from top to bottom. Thus, for example, under normal conditions, circulating liquid passes through open valve 71 to the top of zone I, through open valve 101 and pump 5 for transport via conduit A to zone II. (Valves 81 and 91 are closed during normal operation.) Assuming that it is desired to temporarily reverse the flow direction in zone II at this point, valves 72 and 102 are closed, while valves 82 and 92 are opened. Fluid flow is thus directed through valve 82 to the bottom of zone II, up through this zone and through open valve 92 and pump 6 for transport in normal fashion via conduit B to zone III. Such temporary flow reversals may be effected within any zone at will by setting the valves shown by FIG. 3 in accordance with Table 2. In practice, however, flow reversal is usually effected within each zone in sequence during a fraction of a selected step of operation. Typically, in a step of 10 to 30 minutes in duration, reverse flow for approximately $\frac{1}{2}$ to three minutes is sufficient to prevent compaction.

Ideally, reverse flow is scheduled regularly for each bed once during each complete cycle of the process. Reverse flow causes practically no disruption of the process if it is done in the rinse phase e.g., when the bed is substantially filled with water. According to Table 1, this condition exists for Vessel IV of FIGS. 1 and 3 in Step 1 for Vessel I in Step 2; for Vessel II in Step 3; and for Vessel III in Step 4, respectively. However, reverse flow may be generated at any time in any vessel for a brief period to relieve a threatening high pressure situation.

EXAMPLE

A pilot plant simulated bed process was operated as described in connection with FIG. 1 of the drawings for the separation of fructose from glucose. The feed stock was forty-two percent (42%) HFCS at sixty percent (60%) solids and 70° C. The process included four zones, each of which had two discrete vessels. A total cycle comprised 160 minutes, or eight 20-minute steps. The initial feed flow rate was 90 milleters per minute, and the initial recirculation flow rate was approximately 515 milliliters per minute. After 20 hours of operation, the pressure drop through the loop band increased to 120 psi. Further compaction of the bed required a reduction of the feed rate to 70 milliliters per minute, and the recirculation rate to about 431 milliliters per minute after about six more hours of operation. After a total operation of about 44 hours, further bed compaction required reduction of the feed rate to 62.5 milliliters per minute and the recirculation rate to about 388 milliliters per minute. That is, the operating capacity of the bed was then reduced by about one-half. At this level of operation the total pressure drop through the loop was still about 110 psi.

The manifold system of the process was altered to provide for reversible flow through portions of the bed, as shown by FIG. 3. The process was again run with the same feed material, the same feed rate and the temperature conditions. A counterflow condition was maintained for one minute of each 20 minute step during which each vessel was in the water (desorbent) phase of operation. After 187 hours of continuous operation, a feed rate of 90 milliliters per minute and a recirculation rate of about 554 milliliters per minute were maintained with an average total pressure drop through the loop of about 62 psi.

Reference herein to details of the illustrated embodiments is not intended to restrict the scope of the appended claims, which themselves set forth those details regarded as essential to the invention.

I claim:

1. In a simulated moving bed process in which a plurality of sorbent beds are contained within respective vessels with inlets and outlets connected in a loop so that circulating liquid moves in sequence through said beds while process input streams are cyclically introduced in corresponding sequence to said loop at selected locations associated with said vessels, and compensating process output streams are withdrawn in similarly corresponding sequence from said loop at other selected locations associated with said vessels, all while maintaining a forward flow in a fixed direction through the loop during a plurality of cycles, the improvement which comprises periodically reversing the direction of flow of said circulating liquid through a selected said sorbent bed while maintaining said forward flow through said loop.

2. An improvement according to claim 1 wherein means are provided in association with said loop for periodically reversing the direction of flow of said circulating liquid through said selected sorbent bed.

3. An improvement according to claim 2 wherein said means for periodically reversing direction of flow comprises a system of valves and conduits arranged and operable to reverse the functions of the normal inlet and outlet, respectively, of a vessel containing said selected sorbent bed.

4. An improvement according to claim 2 wherein said means is operated to effect counterflow through each said bed in sequence during each cycle of said process.

5. An improvement according to claim 2 in which each vessel is caused to operate in a rinse mode during a portion of each cycle, and said means is operated periodically to effect counterflow of eluant through said bed during a portion of a step during which said bed is operating in the rinse mode.

6. An improvement according to claim 5 in which said means is operated to effect counterflow through each said bed during a portion of each cycle of said process.

* * * * *